(12) United States Patent
Yamada

(10) Patent No.: US 6,240,796 B1
(45) Date of Patent: *Jun. 5, 2001

(54) SLIDE APPARATUS

(75) Inventor: Koji Yamada, Gifu-ken (JP)

(73) Assignee: Nippon Thompson Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,836

(22) Filed: Jul. 2, 1998

(30) Foreign Application Priority Data

Jul. 8, 1997 (JP) .................................................. 9-196403

(51) Int. Cl.$^7$ .............................. F16H 25/20; F16C 29/06
(52) U.S. Cl. ..................................... 74/89.15; 74/424.8 R
(58) Field of Search ............................ 74/89.15, 424.8 R, 74/459; 403/294, 292, 293; 267/140, 152, 153; 295/35; 384/276; 192/149

(56) References Cited

U.S. PATENT DOCUMENTS

| | | | |
|---|---|---|---|
| 4,739,673 | * | 4/1988 | Ishikawa ............................ 192/149 X |
| 5,311,788 | * | 5/1994 | Kasuga ................................. 74/89.15 |
| 5,445,045 | * | 8/1995 | Nagai et al. ..................... 74/89.15 X |
| 5,454,278 | * | 10/1995 | Kasuga ........................ 74/424.8 R X |
| 5,613,403 | * | 3/1997 | Takei ................................. 74/89.15 X |
| 5,637,940 | * | 6/1997 | Nagai et al. ..................... 74/89.15 X |
| 5,676,016 | * | 10/1997 | Nagai et al. ......................... 74/89.15 |
| 5,747,896 | * | 5/1998 | Nagai et al. ..................... 74/89.15 X |
| 5,749,266 | * | 5/1998 | Tsukada .......................... 74/89.15 X |

FOREIGN PATENT DOCUMENTS

| | | |
|---|---|---|
| 63-193637 | 12/1988 | (JP) . |
| 2-298446 | 12/1990 | (JP) . |
| 7-028444 | 6/1995 | (JP) . |
| 7-061587 | 7/1995 | (JP) . |

OTHER PUBLICATIONS

TU Precision Positioning Tables, Japanese IKO Catalog No. 2708, pp. 1–22, Apr. 1997.*

* cited by examiner

Primary Examiner—David Fenstermacher
Assistant Examiner—William C. Joyce
(74) Attorney, Agent, or Firm—Browdy & Neimark

(57) ABSTRACT

In this slide apparatus, screw shaft supports adapted to support a screw shaft constituting a feed screw mechanism by which a slider is slidingly moved on a track rail are placed on and fixed to an upper surface of the track rail, and one end portion of the screw shaft is supported on a bearing fixed to a bearing support metal member of a thin steel sheet provided on one screw shaft support, whereby the assembling efficiency of the apparatus is improved. The slider is moved forward and backward in a recess of the track rail by a rotational driving force of the screw shaft engaged with a nut provided on the slider. The screw shaft supports supporting end portions of the screw shaft so that the screw shaft can be rotated freely are fixed in a bridged state to a pair of raceways of the track rail. When the lead of the feed screw mechanism is changed or when maintenance work is carried out in this slide apparatus, the screw shaft supports are removed simply from the track rail, whereby the screw shaft and nut can be removed simply from the slider. This enables the working efficiency to be improved.

6 Claims, 10 Drawing Sheets

SLIDE APPARATUS

BACKGROUND OF THE INVENTION

1. Field of the Invention

This invention relates to a slide apparatus applied to linear sliding portions of machine tools, various kinds of assembled apparatuses and test apparatuses.

2. Description of the Prior Art

The mechatronic techniques have been developed remarkably in recent years, and there is a slide apparatus as a basic and multi-purpose apparatus which supports such techniques. A slide apparatus is a unitary combination of a feed screw apparatus and a linear guide apparatus, and has been used with the development of the electronic industries, by being incorporated in apparatuses in various technical fields, such as a machine tool, a semiconductor manufacturing apparatus, a transfer apparatus and an industrial robot. With the development of the techniques, the uses of a slide apparatus have been widened, and this apparatus requires a higher accuracy, a higher speed, easier assembling and higher versatility.

The slide apparatus is provided with a raceway groove-carrying track rail, a slider slidingly movable on the track rail, a screw shaft engaged with a threaded portion of the slider, support plates supporting both end portions of the screw shaft, and a driving motor fixed to either one of the support plates and adapted to rotate the screw shaft. This slide apparatus is controlled electrically and electronically and adapted to guide various kinds of machines and tools which are to be positioned along a straight line.

When such a slide apparatus as a whole is changed with another in accordance with its purpose and scale, the cost increases, and the changing operation becomes troublesome and requires a long period of time. Therefore, the development of a slide apparatus capable of changing the sizes and performance thereof freely, being obtained at a low cost and carrying out a replacement operation speedily is demanded so as to deal with problems which would be encountered when changes occur in the sizes and table supporting and transferring performance of the slide apparatus.

As shown in FIG. 17, a conventional XY positioning table apparatus has track rails 106 fixed on a bed 105, an X table 102 moving forward and backward on the track rails 106 via sliders 113, track rails 108 fixed on a support base 114 on the X table 102, a Y table moving forward and backward on the track rails 108 via sliders 107, a driving motor 104 for an X axis fixed to the bed 105, and a driving motor 103 for a Y axis fixed to the X table 102. The XY positioning table apparatus further has a ball screw shaft 112 supported rotatably on the support base 114, which is provided on the X table 102 driven by the Y axis driving motor 103, via bearings 111, and a ball screw shaft 109 supported rotatably on the bed 105, which is driven by the X axis driving motor 104, via bearings 110. The X table 102 is moved on the ball screw shaft 109 in accordance with the rotation thereof, and the Y table on the ball screw shaft 112 in accordance with the rotation thereof.

In the XY table apparatus, the bearing 110 for the ball screw shaft 109 which is on the motor-provided side is provided on the inner side of the track rails 106, and the bearing 110 on the non-motor-provided side on end surfaces of the track rails 106. Therefore, even when the changing of the length of the track rails 106 and the replacing of the ball screw shafts are done, it is necessary to form bolt holes for use in fixing the bearings 110 and carry out the bearing fixing operations.

The ball screw-united type linear guide apparatus disclosed in Japanese Utility Model Laid-Open No. 193637/1988 is a unitary combination of a ball screw and a linear guide apparatus, which is provided with a guide rail having a groove and ball rolling grooves in both of its inner surfaces, a nut fitted loosely and movable axially in the groove of the guide rail via rolling balls, a ball screw shaft engaged with the nut, support units supporting both end portions of the screw shaft, and a driving motor fixed to one of the support units and adapted to rotate the screw shaft. The groove has a function of an oil reservoir for a lubricating and cooling oil. The support units are fixed to end surfaces of the guide rail by bolts via seal members so as to prevent the leakage of the oil. A cover fixed to the nut encloses the groove of the guide rail.

The known table transfer apparatuses include a table transfer apparatus of a structure in which a table is supported movably by a guide and adapted to be transferred by a feed screw shaft. This table transfer apparatus is provided with a guide rail having a C-shaped cross section and upper and lower rolling element raceway surfaces in the inner side surfaces, a table supported movably on the guide rail so as to be held between the inner surfaces of the guide rail via rolling balls, and a feed screw shaft screwed to the table. This feed screw shaft is rotated by a motor, one end portion of the feed screw shaft being supported pivotably on a bearing portion provided on one end portion of the guide rail, the other end portion of the feed screw shaft being operatively connected to a motor, which is fixed to the other end portion of the guide rail, via a joint (refer to, for example, Japanese Patent Laid-Open No. 298446/1990 and Japanese Patent Publication No. 61587/1995).

In a conventional slide apparatus, support plates supporting both end portions of a screw shaft are fixed end surfaces of a guide rail, so that the working efficiency and positioning operations in the assembling and disassembling of the apparatus for the maintenance thereof become low and troublesome respectively. When the length of the guide rail is changed, bolt holes are formed in a cut end surface thereof by a tapping process. To carry out the tapping process, it is necessary to use a fixing jig for securing the guide rail to a support base.

The feed unit apparatus disclosed in Japanese Utility Model Publication No. 28444/1995 has a structure in which a feed screw apparatus and a linear guide apparatus are unitarily combined, the feed unit apparatus being provided with an upper side-opened cross-sectionally C-shaped elongated guide rail having mutually opposed axially extending ball rolling grooves in both of inner side surfaces thereof, a nut block having in both of outer side surfaces thereof ball rolling grooves opposed to those of the guide rail, a feed screw shaft engaged with the nut block, and support units fixed to the guide rail and supporting the feed screw shaft so that the feed screw shaft can be rotated freely and cannot be moved axially. The positioning of the support unit is done by fixing the same to the guide rail by engaging pins implanted in the support units with the ball rolling grooves of the guide rail. The specification of this feed unit apparatus discloses various types of fixing structures for fitting the motor-side support unit in the guide rail. However, since the fitting portion has to be formed during the manufacture of the support unit, the fitting position of the support unit cannot be changed.

SUMMARY OF THE INVENTION

An object of the present invention is to solve the above-mentioned problems, and provide a slide apparatus having a nut which is engaged with a screw shaft slidingly moving a slider on a track rail, and which is fixed to the slider, and screw shaft supports supporting both end portions of the screw shaft and fixed to an upper surface of the track rail, whereby the slide apparatus enables the disassembling and assembling operations for the maintenance thereof and for meeting the requirements when the length of the track rail is changed, as well as various operations for fixing the screw shaft supports to the track rail to be simplified.

The present invention relates to a slide apparatus comprising a track rail having a pair of raceways extending in the longitudinal direction thereof in a mutually opposed state, a slider capable of being moved slidingly along the raceways of the track rail, a nut fixed to the slider, a screw shaft engaged with the nut, a pair of screw shaft supports supporting both end portions of the screw shaft and fixed in a bridged state to the upper surfaces of both end portions of the two raceways, a bearing supporting at least one of the end portions of the screw shaft, a bearing support metal member of a thin steel sheet, to which the bearing is fixed, provided fixedly in a bearing housing provided on one of the screw shaft supports, a feed screw mechanism formed of the nut and screw shaft and adapted to slidingly move the slider with respect to the track rail, and a driving motor fixed to either one of the screw shaft supports so as to move the nut by rotating the screw shaft.

The feed screw mechanism is formed as a ball screw provided with the nut, screw shaft, and balls provided between a helical grooves of the nut and that of the screw shaft.

The track rail is formed to a longitudinally extending recessed structure by the two raceways and a bottom portion combined with the two raceways into an integral structure, and the slider is disposed slidably in a recessed portion of the track rail.

The slider has a casing provided with second raceway grooves opposed to first raceway grooves formed in the raceways of the track rail, rolling elements rolling between the first and second raceway grooves, end caps fixed to both end surfaces of the casing, and end seals fixed to the end surfaces of the end caps.

The end caps are provided with grease nipples. The grease nipples are positioned so as to be opposed to hollow space opened between the screw shaft supports and the recess, for use in supplying an oil. Accordingly, it becomes possible to connect an oil supply device, such as a hose and a nozzle squarely to each grease nipple in the longitudinal direction of the track rail from the outside thereof through the hollow space mentioned above, and supply an oil from the grease nipples to the inside easily and simply.

The positioning and fixing of the driving motor with respect to the screw shaft support are done by fitting a ring, which is press-fitted firmly in a motor attachment fixed to the driving motor, in a fixing hole formed in the screw shaft support. Therefore, the driving motor is positioned on the screw shaft support by fitting the press-fitted ring in the fixing hole of the screw shaft support via the motor attachment provided in accordance with the fixing specifications of the motor. The type of the driving motor is changed in accordance with the purpose of use of the slide apparatus. The fixing specifications which include the position and size of the fixing hole formed correspondingly to the driving motor, and which are used for the positioning and fixing of the driving motor, differ with the type of the motor. Therefore, when the driving motor is fixed to the screw shaft support via the motor attachment, the differences in the fixing specifications due to the difference in the type of the driving motor are offset. Consequently, a structure for carrying out the replacement and fixing of the motor is simplified, and the efficiency of these operations is improved. Since the ring press-fitted firmly in the motor attachment is engaged with the screw shaft support, the positioning of the driving motor on the screw shaft support is done easily.

This slide apparatus is provided with a stopper which comprises a core metal member of a thin steel sheet, and a rubber member baked on the core metal member, and which has a cushioning function, the stopper being fixed to an opposed end surface of the screw shaft support and/or slider. Since the stopper can be fixed as a part by bolts, the fixing and removing of the stopper become easy, and the efficiency of the stopper replacement and fixing operations is improved.

This slide apparatus is provided with sensor rails on the track rail, the sensor rails extending in the longitudinal direction of the track rail, and comprising cover portions formed so as to seal clearances between the track rail and slider, and sensor-fixing rail portions formed on the outer side of the cover portions so as to be integral therewith, and provided thereon with sensors for detecting the position of the slider. Since the sensors can be provided on longitudinally arbitrary and necessary portions of the sensor rails, the changing of the sensor fixing positions and the sensor fixing operations are simplified. When the sensor rails are fixed to the track rails, the cover portions of the sensor rails enclose the clearances between the track rail and slider and fulfill the dust-proofing function, i.e. the function of preventing extraneous matter from entering the same clearances.

In this slide apparatus, the slider and screw shaft are covered with a dust-proof cover laid between the screw shaft supports fixed to both end portions of the track rail. In a slide apparatus using the dust-proof cover, the slider has fixing flanges, which extend from side edge portions of the dust-proof cover in the sideway and upward directions. Since the dust-proof cover encloses the upper portions of the slider and screw shaft which constitute a driving portion of the slide apparatus, it protects the driving portion against the fall of extraneous matter, such as dust from the upper side and the entry of the extraneous matter thereinto. The slider is inserted in the U-shaped recess of the track rail formed of a pair of raceways and a bottom portion, so that this recessed structure constitutes a protective structure substantially enclosed at an upper portion thereof with the dust-proof cover.

In this slide apparatus, the slider has a basic structure of a linear motion rolling guide unit, and rolling elements inserted in the recess between a pair of raceways constituting the track rail, in such a manner that the rolling elements do not rattle. The rolling elements are moved smoothly with respect to the track rail, and the position and speed of the slider can therefore be set with a high accuracy.

Since this slide apparatus is formed as described above, the bearing support metal member of a thin steel sheet used in the support structure can be manufactured easily and combined with the screw shaft support easily. When it is necessary to remove the feed screw mechanism from the slide apparatus for the purpose of carrying out maintenance work or replacing the feed screw mechanism so as to change the lead and diameter of the screw, a pair of screw shaft supports placed on and fixed to the upper surfaces of the two raceways are removed from the track rail by an operation carried out from a position above the two raceways with the screw shaft supporting force released. Since the nut, which constitutes the feed screw mechanism with the screw shaft is then ready to be removed from the slider. When the nut left engaged with the screw shaft is removed from the slider without removing the slider as a whole from the slide apparatus and without replacing the slider as a whole with another, the maintenance work can be carried out, and the screw shaft and nut can be replaced with a screw shaft and a nut which have another lead and screw diameter.

DESCRIPTION OF THE PREFERRED EMBODIMENTS

The embodiments of the slide apparatus according to the present invention will now be described with reference to the drawings.

A first embodiment of the slide apparatus according to the present invention will now be described with reference to FIGS. 1–11.

Figure 7:
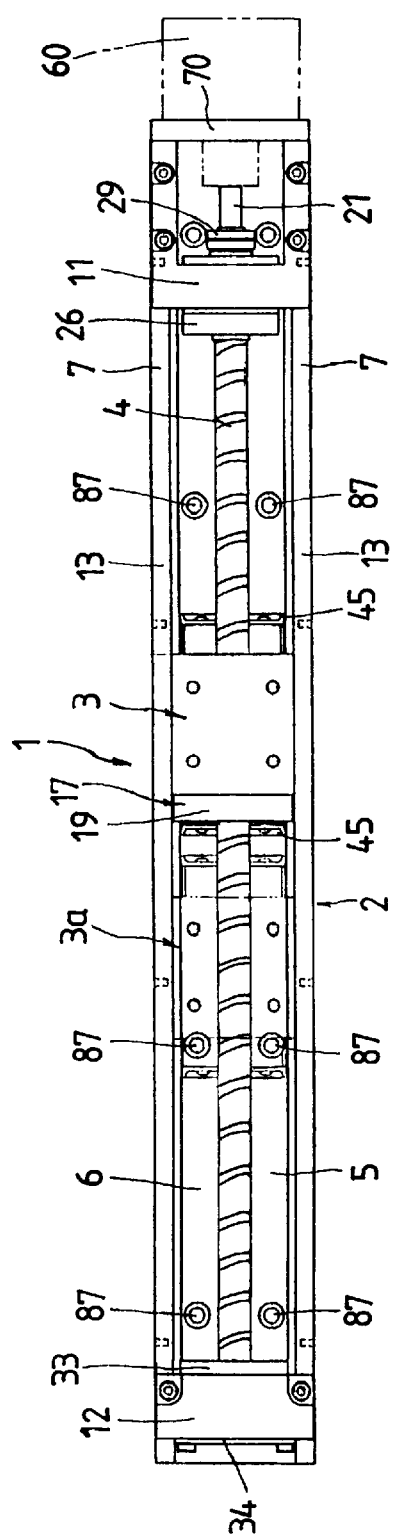
FIG. 7 is a plan view of a principal portion of the slide apparatus shown in FIG. 1.
Figure 8:
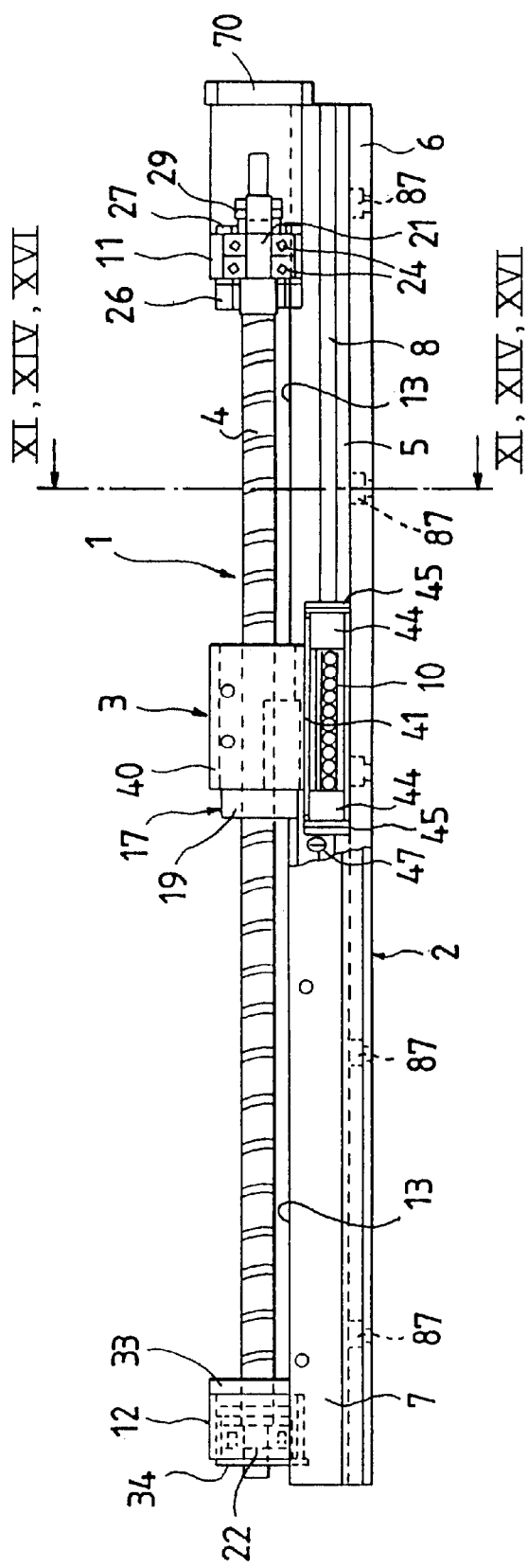
FIG. 8 is a partially cutaway side elevation of a track rail of the slide apparatus shown in FIG. 1.
Figure 10:
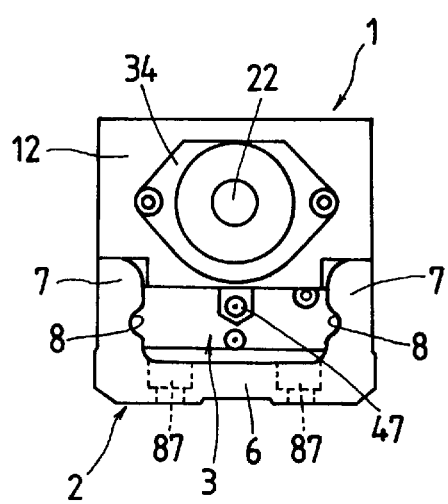
FIG. 10 is an end view of an end portion of the slide apparatus shown in FIG. 1.
Figure 11:
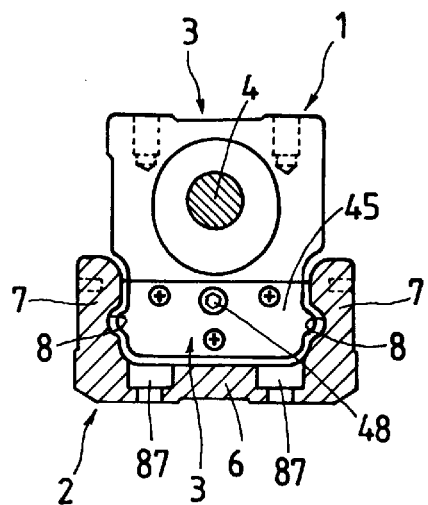
FIG. 11 is a sectional view taken along the line XI—XI shown by direction-indicating arrows in FIG. 8.
Figure 12:
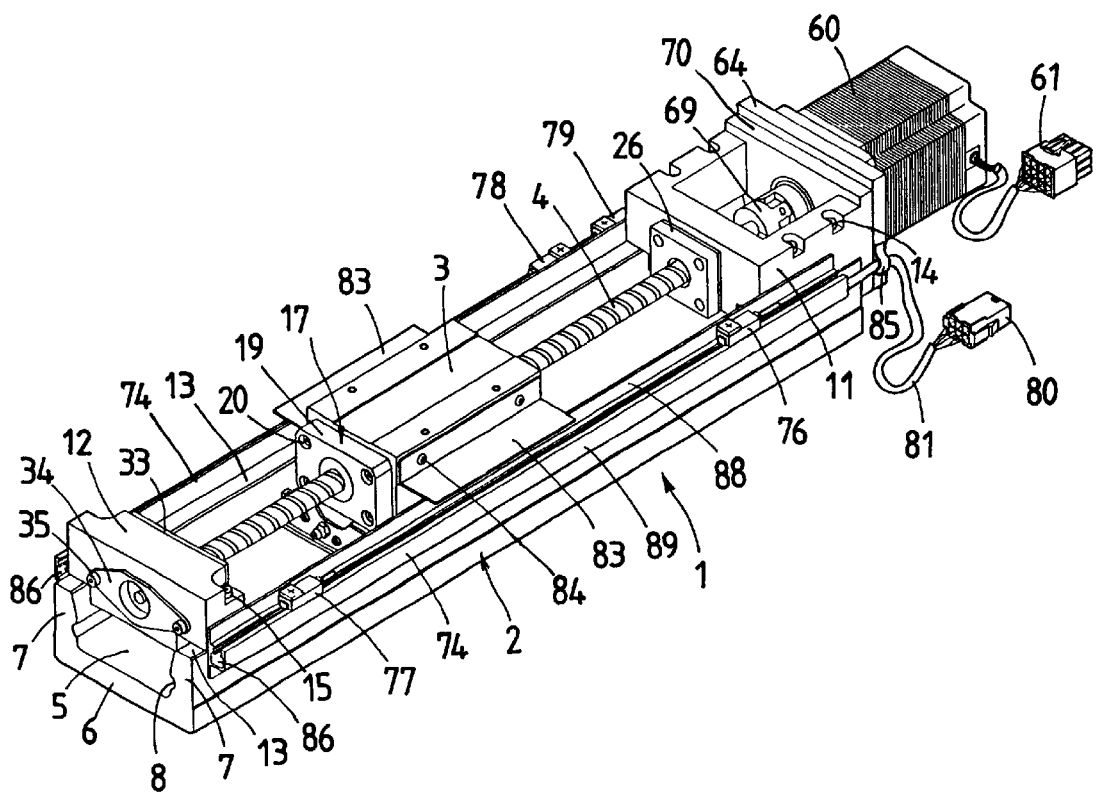
FIG. 12 is a perspective view showing a second embodiment of the slide apparatus according to the present invention.

As shown, especially, in FIGS. 1 and 7–11, a slide apparatus 1 comprises basically an upper side-opened cross-sectionally U-shaped elongated track rail 2, a slider 3 disposed movably in a U-shaped recess 5 of the track rail 2, a screw shaft 4 engaged with the slider 3, and a driving motor 60 (refer to FIG. 12). The track rail 2 is fixed on a support base (not shown) by fixing means, such as fixing bolts inserted through fixing holes 87 (FIG. 7). An object to be mounted (not shown) in fixed to the slider 3 by fixing means, such as fixing bolts. When the slider 3 is moved slidingly with respect to the track rail 2, this mounted object can be moved with respect to the support base. The track rail 2 is formed to a unitary structure by a bottom portion 6 and a pair of raceways 7 extending upward from both sides of the bottom portion 6, the bottom portion 6 and raceways 7 forming a longitudinally extending U-shaped recess 5. The two raceways 7 are combined with each other by the bottom portion 6. The opposed inner surfaces of the two raceways 7 of the track rail 2 are provided with a pair of longitudinally parallel-extending raceway grooves 8, and a casing 40 of the slider 3 raceway grooves 9 correspondingly to the raceway grooves 8. The slider 3 can be slid smoothly and accurately with respect to the track rail 2 via a plurality of rolling elements 10 rolling between the raceway grooves 8, 9, and the track rail 2 and slider 3 form a kind of linear motion rolling guide unit.

The slider 3 is provided with a nut 17 having a helical groove (not shown) and fixed thereto. The helical groove of the nut 17 is engaged with the screw shaft 4 having a helical groove in its outer circumferential surface. The screw shaft 4 and nut 17 constitute a feed screw mechanism adapted to move the nut linearly in the axial direction in accordance with the rotation of the screw shaft 4. Accordingly, when the nut is moved linearly in the axial direction of the screw shaft 4, the slider 3 fixed to the nut 17 is moved slidingly in the longitudinal direction of the track rail 2. The feed screw mechanism is formed as a ball screw provided with the screw shaft 4, nut 17, and balls inserted between the two helical grooves, and the nut 17 is provided with a circulating passage (not shown) in which balls are circulated between the two helical grooves. This slide apparatus is formed so that slider 3 is slid smoothly, accurately and linearly on the track rail 2 by using the ball screw.

The screw shaft supports 11, 12 are formed out of, for example, an aluminum alloy, and fixed to the track rail 2 by fixing screws inserted into screw holes formed by tapping in the upper surfaces 13 of both end portions of the raceways 7 of the track rail 2. The raceway grooves 8 of the track rail and the upper surfaces 13 are formed in parallel with each other. Therefore, when the screw shaft supports 11, 12 are placed on the upper surfaces 13 of the track rail 2, the perpendicular (vertical) positioning can be done. When the screw shaft supports 11, 12 are then positioned in the horizontal direction (lateral direction) with respect to the track rail 2 and fixed thereto, it becomes possible to oppose the raceway grooves 9 of the slider 3 to those 8 of the track rail 2, and dispose the screw shaft 4 accurately in the sliding direction of the slider 3 with respect to the track rail 2. Accordingly, the screw shaft supports 11, 12 can be positioned simply with respect to the track rail 2.

The screw shaft supports 11, 12 placed on the upper surfaces 13 of the track rail 2 are fixed thereto by inserting fixing bolts 14, 15 through fixing through holes provided in the screw shaft supports 11, 12, and then into screw holes made in the track rail 2. The track rail 2 can be used by being cut to a desired length suitably in accordance with the condition of use, and the screw holes of the track rail 2 are formed by tapping the upper surfaces 13 of the track rail 2 from the upper side thereof.

Therefore, the efficiency in the hole making operation in this slide apparatus is improved as compared with that in a conventional slide apparatus in which screw holes are made in a lateral direction in the end surfaces of raceways of a track rail with the track rail fixed by a fixing jig. The efficiency in the fixing operations in the slide apparatus according to the present invention is also improved as compared with that in the corresponding operations in a conventional slide apparatus which are carried out as the screw shaft supports are positioned with respect to the side surfaces of the track rail in the perpendicular direction (position in the direction of the height) and horizontal direction (lateral position) simultaneously. Only a proper number of various kinds of bolts, such as the fixing bolts 14, 15, or fixing holes are provided so as to obtain a preferable fixed condition.

Figure 1:
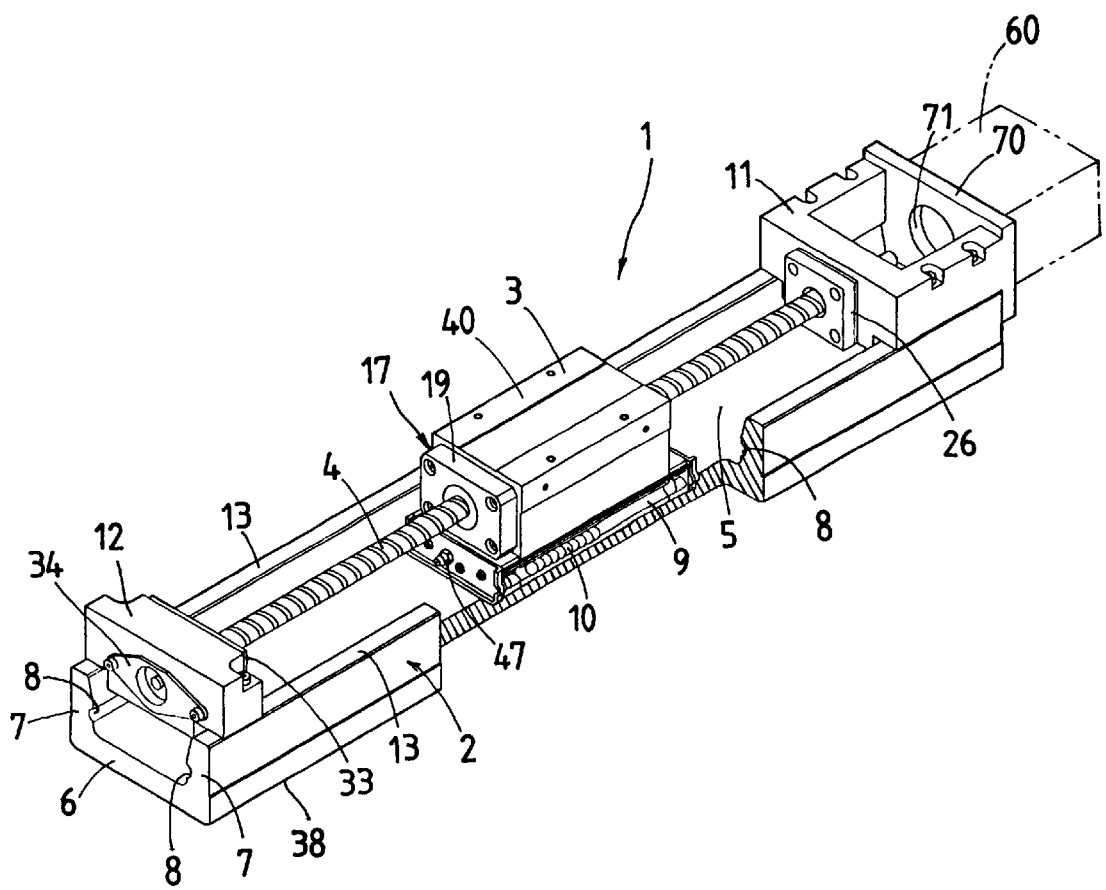
FIG. 1 is a perspective view showing a partially cutaway condition of a first embodiment of the slide apparatus according to the present invention.
Figure 2:
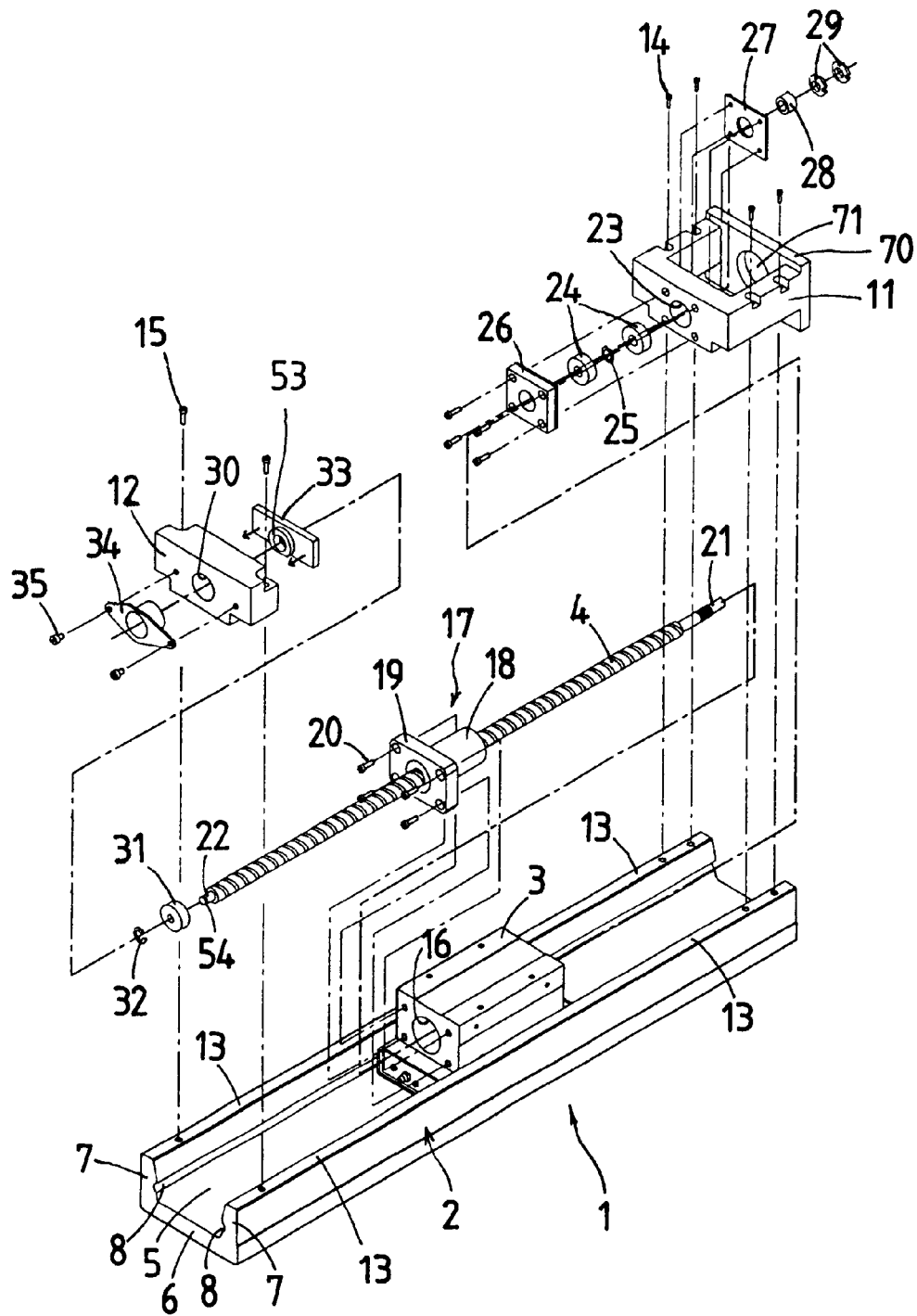
FIG. 2 is a perspective view showing an exploded condition of the slide apparatus shown in FIG. 1.

As shown, especially, in FIG. 2, a cylindrical portion 18 of the nut 17 which has a helical groove engaged with the screw shaft 4 is fitted in a through hole 16 formed in the slider 3, and the nut 17 is fixed with the screw shaft 4 to the slider 3 by screwing screw shaft fixing bolts 20 into the slider 3 through the fixing holes made in four corner portions of a flange 19 formed with the cylindrical portion 18 into an integral part. Therefore, when it is necessary to remove the screw shaft 4 from the slide apparatus 1 for the purpose of changing the lead of the screw shaft 4 or carrying out the maintenance work for the apparatus, the screw shaft 4 has only to be removed with the nut 17 by separating the nut 17 from the slider 3, and the slider 3 as a whole or the slider 3 as well as the track rail has not to be removed. When a changed screw shaft is installed in the slide apparatus 1, or when the screw shaft 4 is returned to the slide apparatus after the maintenance work has finished, slider 3 is left engaged with the track rail 2, so that an operation for mounting a ball screw on the slider 3 is simplified.

The bearing support 11 is provided with a bearing support structure, which will be described below, so as to support a diameter-reduced motor-side end portion 21 of the screw shaft 4. The screw shaft support 11 is provided with a bearing housing 23 correspondingly to the motor-side end portion 21, and a pair of angular bearings 24 is installed with a shim 25 interposed therebetween in this bearing housing 23. In order to prevent the angular bearings 24 from slipping out, bearing holders 26, 27 are provided on both sides of the bearing housing 23. The motor-side end portion 21 of the screw shaft 4 passed through the bearing holder 26, an angular bearing 24, a shim 25, an angular bearing 24 and bearing holder 27 is then passed through a collar 28 and tightened by lock nuts 29. Consequently, the bearing support structure is completed, and the motor-side end portion 21 is supported rotably on the bearing support structure. The bearing holder 26 has a function of a stopper for cushioning an impact when the slider 3 collides with the motor-side screw shaft support 11.

The diameter of the end portion 22 of the screw shaft 4 is also reduced in the same manner as that of the motor-side end portion 21 thereof, and a bearing support structure is formed which will be described below. A bearing housing 30 is formed in the screw shaft support 12 correspondingly to the end portion 22, and a bearing support metal member 34 is fitted in the housing 30 from the outer side thereof. In the bearing support metal member 34 fitted in the bearing housing 30, a bearing 31 and an E-shaped lock ring 32 are provided. The bearing support metal member 34 is fixed to the screw shaft support 12 by a metal member fixing bolt 35.

Figure 3:
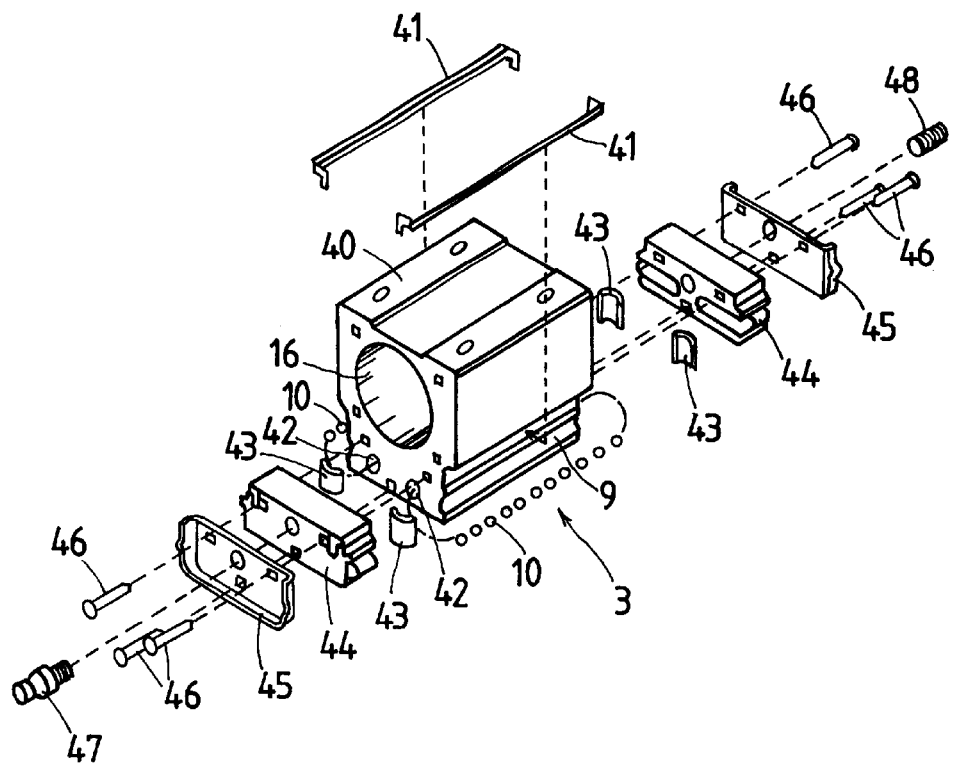
FIG. 3 is a perspective view showing an exploded condition of a slider in the slide apparatus shown in FIG. 1.

As shown, especially, in FIG. 3, the slider 3 is provided with a casing 40 having raceway grooves 9, in which balls 10 roll, in the lower portions of the side surfaces thereof, and a through hole 16 extending in the longitudinal direction in a central portion thereof; and a pair of end caps 44 provided on both end surfaces of the casing 40. The clearances between the side surfaces of upper portions of the raceway grooves 9 and the track rail 2 are sealed with upper seals 41. The rolling elements 10 are circulated endlessly in the raceway grooves 9 and return passages 42 which are formed in the casing 40, and direction changing passages having circulating groove spacers 43 and provided in the end caps 44. On the outer side of the end caps, a pair of end seals 45 for sealing the clearances between the end caps 44 and track rail 2 are provided. The end caps 44 and end seals 45 are fixed to the casing 40 by bolts 46 passed through the same parts 44, 45. A grease nipple 47 is connected to the end cap 44 through at least one end seal 45, and a lubricating oil from the outside is supplied to each endless circulating passage. The other end cap 44 and end seal 45 are provided with a stop plug 48 for preventing the lubricating oil from leaking.

Figure 4:
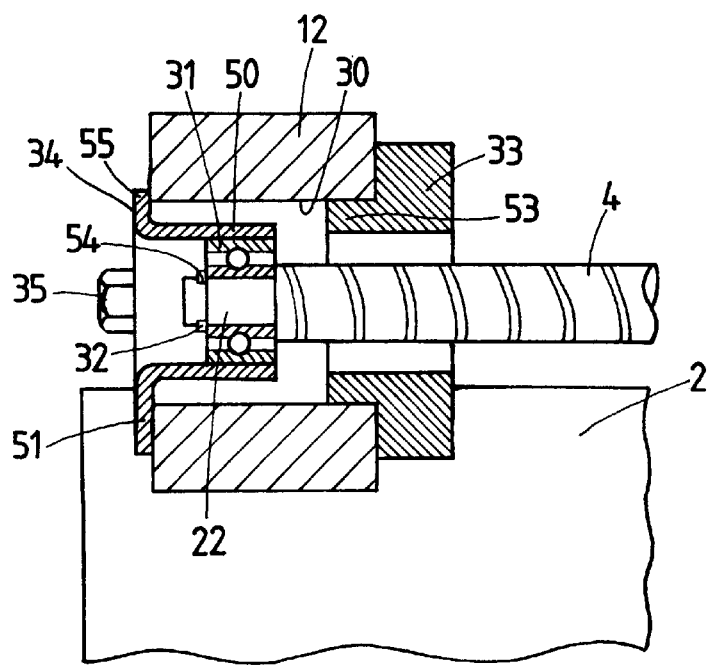
FIG. 4 is a sectional view of a support structure on one portion of a screw shaft in the slide apparatus shown in FIG. 1.

A support structure for the end portion 22 of the screw shaft 4 in the screw shaft support 12 will now be described. FIG. 4 is a sectional view of the screw shaft support 12 taken along a vertical plane including the axis of the screw shaft 4.

Figure 5:
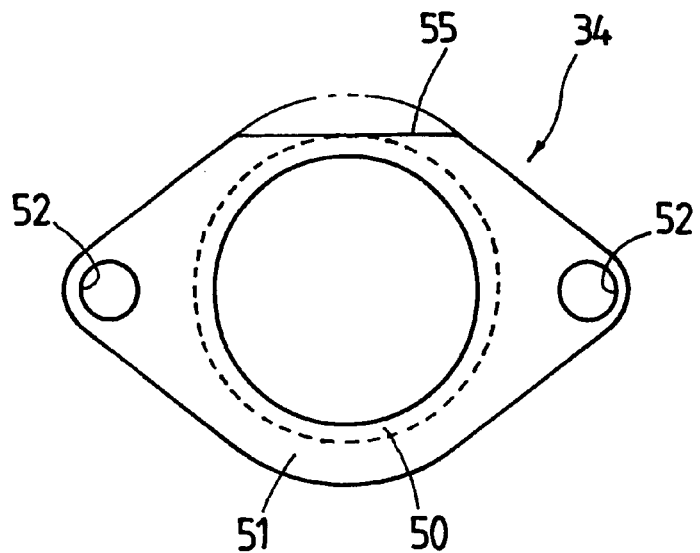
FIG. 5 is a front view of a bearing support metal member used in the support structure shown in FIG. 4.
Figure 6:
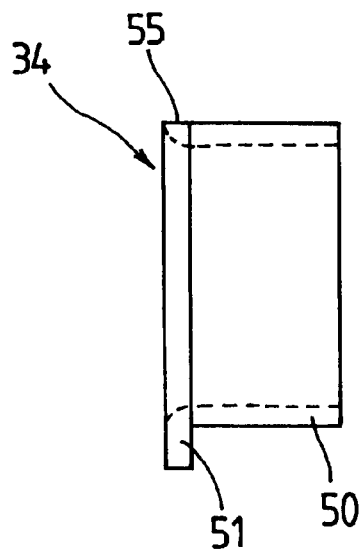
FIG. 6 is a side view of the bearing support metal member shown in FIG. 5.

As shown in FIGS. 4, 5 and 6, the bearing support metal member 34 comprises a cylindrical portion 50 to which an outer race of the bearing 31 is fitted, and a flange 51 extending an outer section of the cylindrical portion 50 in the radial direction, and, when the bearing support metal member is combined with the screw shaft support 12, one side portion of the flange 51 engages an end surface of the screw shaft support 12. Both of the side portions of the flange 51 are enlarged, and holes 52 through which fixing bolts 35 are to be inserted are formed in these enlarged portions. The screw shaft support 12 is provided with holes into which fixing bolts 35 are inserted, in such a manner that these holes correspond to the insert holes 52. The stopper 33 is provided at the central portion thereof with a stepped portion 53, which is fitted in the bearing housing 30 of the screw shaft support 12.

The bearing support metal member 34 is fixed to the screw shaft support 12 by inserting the fixing bolts 35 through the insert holes 52 of the bearing support metal member 34 with this member 34 combined with the screw shaft support 12, and then screwing the bolts 35 into the screw shaft support 12. Since the stopper 33 has an impact lessening material, it is bonded to the screw shaft support 12. The E-shaped locking ring 32 is engaged with a groove 54 formed in the end portion 22 of the screw 4, whereby the slipping out of the bearing 31 from the end portion 22 is prevented. The upper edge portion of the flange 51 of the bearing support metal member 34 is formed as a flat edge 55 so that the flange 51 does not project from an upper edge of the screw shaft support 12. Since this shaft support structure uses the simply constructed bearing support metal member of a thin steel sheet, the manufacturing of the bearing shaft support metal member 34 is done simply, and the positioning of the metal member 34 with respect to and the combining thereof with the screw shaft support 12 can be done easily.

As shown in FIG. 7, a plurality of sliders 3 (two sliders) are provided on one track rail 2 in this slide apparatus in according with a position and a load of an object to be mounted. In the slide apparatus of FIG. 7, two sliders 3, 3a, wherein one slider 3 is shown by solid lines with the other shown in phantom, are provided in a closest-disposed state. A load to be supported by per slider does not become excessively large, and the load of a mounted object can be supported at a supporting point in well-balanced condition. The bottom portion 6 of the track rail 2 is provided with fixing holes, through which fixing bolts (not shown) for securing the track rail 2 to the support base are inserted, in two rows at regular intervals.

Figure 9:
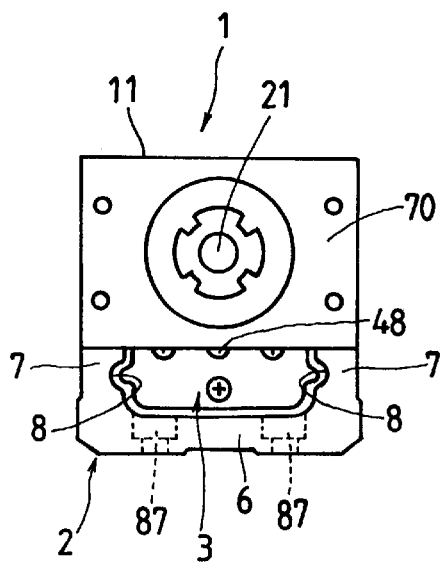
FIG. 9 is an end view of a motor-side section of a principal portion of the slide apparatus shown in FIG. 1.

As shown in FIGS. 9–11, the flexural rigidity of the track rail 2 in the slide apparatus 1 is heightened by increasing the moment of inertia of area of the portions thereof which are around the lateral and longitudinal axes thereof. Therefore, even when a downward load of a table supported on the slider 3 is exerted on the track rail 2, the amount of displacement which would occur most greatly in the portions thereof which are between two longitudinally adjacent fixing holes 87, 87 can be minimized. An end plate 70 of the screw shaft support 11 will be described later in connection with the fixing of the driving motor (refer to a reference numeral 60 in FIG. 12).

A second embodiment of the slide apparatus according to the present invention will now be described with reference to FIGS. 12, 13 and 14.

The second embodiment is characterized in that sensors are provided on the slide apparatus 1 described in the first embodiment. In the second embodiment, the fixing of the driving motor 60 to the end plate 70 of the screw shaft support 11, a description of which was omitted in the first embodiment, will also be described.

As shown in FIG. 12, the slide apparatus 1 is provided with a driving motor 60 and sensors 76, 77, 78, 79. The driving motor 60 comprises a stepping motor, into which a control current is inputted from a controller (not shown) through a motor connector 61, a rotational force being outputted to an output shaft 63 (refer to FIG. 13). The driving motor 60 is fixed to a motor attachment 64, which is fixed to the motor-side screw shaft support 11 by fixing bolts (not shown) driven thereinto in parallel with the axis of the screw shaft 4, by fixing bolts 65. Since the driving motor 60 is fixed to the motor-side screw shaft support 11 via the motor attachment 64 formed in accordance with the fixing specifications of various kinds of driving motors, a variety of kinds of driving motors of different output levels selected in accordance with the use of the slide apparatus 1 can be fixed simply to the motor-side screw shaft support 11.

Since the driving motor 60 is fixed to the motor-side screw shaft support 11, which is placed on and fixed to the upper surface of a track rail 2, via the motor attachment 64, the driving motor does not greatly project from the track rail 2 as compared with a driving motor fixed to a motor-side screw shaft support secured to an end surface of a track rail 2, and, when the track rail 2 is fixed to a support base, a load can be supported in a well-balanced condition on the track rail 2.

Figure 13:
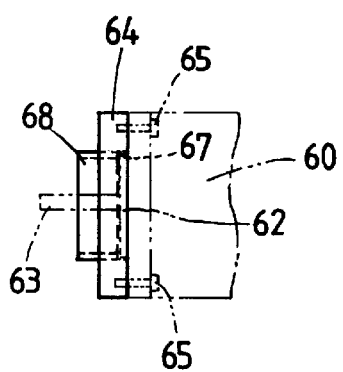
FIG. 13 is a side elevation showing a motor attachment used for the slide apparatus shown in FIG. 12.

As shown in FIG. 13, a through hole 67 is formed in a central portion of the motor attachment 64, and a part of a ring 68 to be press-fitted is inserted into the through hole 67 up to an intermediate portion thereof and fixed. The remaining portion of the press-fitted ring 68 project from the through hole 67 of the attachment, and this projecting portion is fitted in a fixing hole 71 (refer to FIGS. 1 and 2) formed in the end plate 70 of the motor-side screw shaft support 11. A fixing projection 62 of the driving motor 60 is fitted in the remaining portion of the through hole 67. Press-fitting and fixing the separately-formed ring in the through hole enables the manufacturing process to be carried out more easily, and the manufacturing accuracy to be improved compared with forming a ring on a motor attachment 64 so that the ring is integral with the attachment. The output shaft 63 of the driving motor 60 extends through the interior of the press-fitted ring 68, and the output shaft 63 of the driving motor 60 and a motor-side end portion 21 of the screw shaft 4 are connected together by a coupling 69 in the motor-side screw shaft support 11.

Since the motor-side screw shaft support 11 or the non-motor-side screw shaft support 12 is placed on and fixed to the upper surface 13 of the track rail 2, the slider 3 in the U-shaped recess 5 can be accessed longitudinally from the outside of the motor-side and non-motor-side end portions of the track rail 2 through a hollow space between the track rail 2 and the screw shaft supports 11, 12. This access is made easily and advantageously, especially, at the non-motor-side end. Accordingly, when an oil supplier is connected to grease nipples 47 in the end caps 44 so as to supply an oil to return passages 42 and raceway grooves 9 of the casing 40 and direction changing passages in the end caps 44, the grease nipples 47 can be positioned in an opposed state in a hollow space opened between the screw shaft support 12 and an end portion of the recess 5. Namely, the oil supplier can be connected to the grease nipples 47 squarely and naturally without forcing the oil supplier to access the grease nipples diagonally with respect to the slider 3 and in an unnatural posture as in a conventional apparatus of this kind.

Even when the slider 3 in the slide apparatus 1 should collide with the screw shaft support 11, the occurrence of damage due to the collision shock is prevented by the stopper 26, which functions as a bearing holder, fixed to the screw shaft support 11. The stopper 26 is formed by baking rubber on a steel sheet as a core plate in the same manner as the bearing holder 27. Since the stopper 26 is formed as a shock absorbing member, it can be fixed to the screw shaft support 11 by bolts. Therefore, the stopper 26 as a shock absorbing member can be fixed to the screw shaft support 11 easily by bolts with the core plate thereof used also as the bearing holder 27 as compared with a conventional rubber-like stopper which is pasted on a screw shaft support with a bonding agent, since this stopper, which generally comprises an elastic body, cannot be fixed to the screw shaft support directly by bolts. When the bearing holder 27 is provided on the screw shaft support 11, the stopper 26 may be provided on the slider 3.

Figure 14:
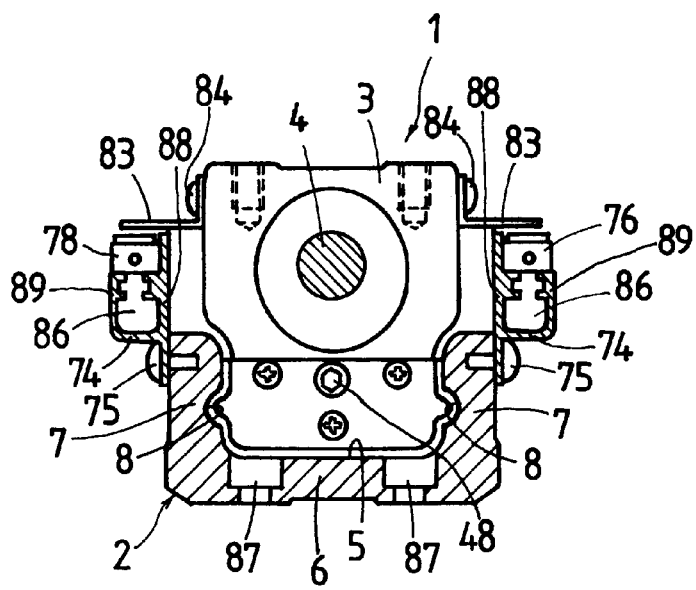
FIG. 14 is a sectional view of the portion of the slide apparatus of FIG. 12 which corresponds to the portion taken along the line XIV—XIV in FIG. 8 shown by direction-indicating arrows.

As shown in FIGS. 12 and 14, sensor rails 74 are fixed by fixing bolts 75 to outer surfaces of a pair of raceways 7 of the track rail 2. Sensors 76–79 are provided on arbitrary positions, which need be specified, on the sensor rails 74. For example, the sensor 76 is used to detect an origin, and the sensor 78 a point before the origin. The signals detected by the sensors 76–79 are inputted from a sensor connector 80 into a controller (not shown) through a lead wire 81. Dogs 83 are fixed to side surfaces of the slider 3 by fixing bolts 84, and, when the slider 3 is moved along the track rail 2 by a rotational movement of the screw shaft 4, the sensors 76–79 detect the dogs 83 and transmit the information on the position of the slider 3 to the controller. The lead wire 81 connecting the sensors 76–79 and sensor connector 80 together can be engaged with the motor attachment by a nylon clamp 85.

When the motor connector 61 and sensor connector 80 are connected to a driver and controller (not shown), the controller outputs a control signal to the stepping motor 60 which serves as a driving motor on the basis of a signal, which is representative of the detection of the dogs 83, from the sensor connector 80, and controls its output rotation. As shown in FIG. 14, the sensor rails 74 are provided with longitudinally extending lead wire fitting grooves 86, in which the lead wire 81 connected to the sensors 76–79 can be held. The sensor rails 74 also constitute dust-proof covers enclosing the track rail 2 and side surface portions of the slider 3, and comprises wide cover portions 88 and sensor fixing rail portions 89 which are formed so as to be integral with each other. Referring to this drawing, the bottom portion 6 of the track rail 2 is provided with fixing holes 87, through which bolts for fixing the track rail 2 to a support base (not shown) are inserted, in two rows at regular intervals.

A third embodiment of the slide apparatus according to the present invention will now be described with reference to FIGS. 15 and 16.

Figure 15:
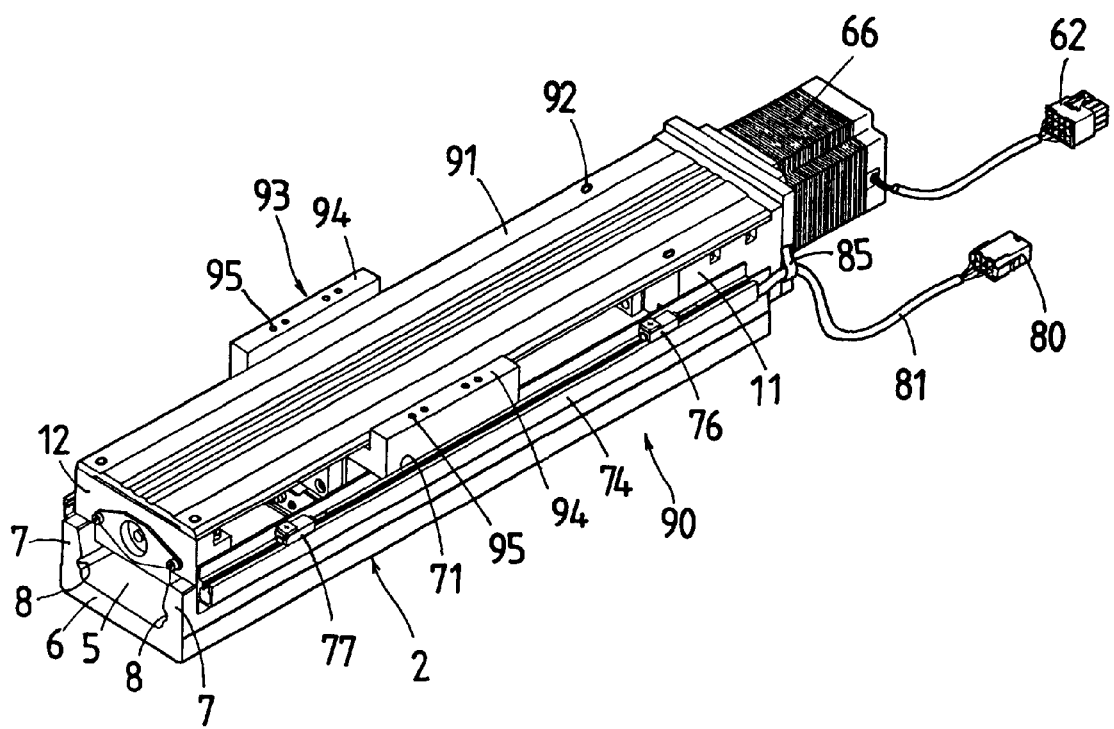
FIG. 15 is a perspective view showing a third embodiment of the slide apparatus according to the present invention.
Figure 16:
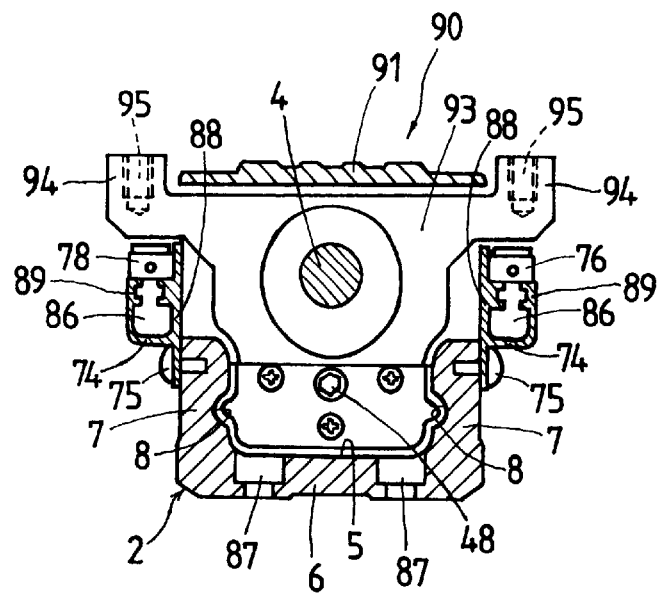
FIG. 16 is a sectional view of the portion of the slide apparatus of FIG. 15 which corresponds to the portion taken along the line XVI—XVI in FIG. 8 shown by direction-indicating arrows.
Figure 17:
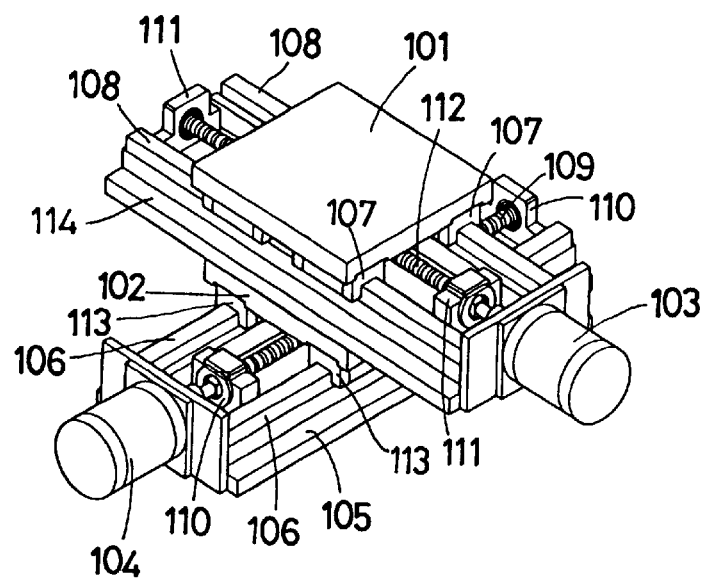
FIG. 17 is a perspective view showing a conventional XY positioning table apparatus.

As shown in FIGS. 15 and 16, a slide apparatus 90 is provided with a dust-proof cover 91 for protecting a slider 3 and a screw shaft 4, which are held in a track rail 2, from the outside. The third embodiment does not differ in construction from the slide apparatus 1 in the first embodiment except that a slider has a different construction and is provided with the dust-proof cover 91. Therefore, the constituent elements having the same construction and function are designated by the same reference numerals, and duplicate descriptions are omitted.

In the third embodiment, a slider 93 and a screw shaft are enclosed with a dust-proof cover 91 which is laid between screw shaft supports 11, 12 fixed to both end portions of the track rail 2. The slider 93 has a pair of fixing flanges 94, which extend from both side edge portions of the dust-proof cover 91 in the sideway and upward directions, so as to avoid the interference thereof with the dust-proof cover 91. An object to be mounted (not shown) is fixed to the flanges 94 by fixing bolts (not shown) screwed to threads fixing holes 95. The flanges 94 also has the function of the dogs 83 in the slide apparatus 1. The dust-proof cover 91 is fixed to the screw shaft supports 11, 12 from a position above the same by fixing bolts 92.

What is claimed is:

1. A slide apparatus comprising
   a track rail having a pair of raceways extending in a longitudinal direction thereof in a mutually opposed state,
   a slider capable of being moved slidingly along said raceways of said track rail,
   a nut fixed to said slider,
   a screw shaft engaged with said nut,
   a pair of screw shaft supports supporting two end portions of said screw shaft and fixed in a bridged state to upper surfaces of two end portions of said two raceways,
   a bearing supporting at least one of the end portions of said screw shaft,
   a bearing support metal member comprising thin steel sheet, to which said bearing is fixed, provided fixedly in a bearing housing provided on one of said screw shaft supports,
   a feed screw mechanism formed of said nut and said screw shaft and adapted to slidingly move said slider with respect to said track rail, and
   a driving motor fixed to either one of said screw shaft supports so as to move said nut by rotating said screw shaft;
   wherein said feed screw mechanism includes a ball screw provided with said nut and said screw shaft, and balls provided between a helical groove of said nut and that of said screw shaft;
   wherein said track rail includes a longitudinally extending bottom portion and said two raceways extend along widthwise opposing sides of the bottom portion to form a recess, wherein said slider fits for sliding movement along said track rail;
   wherein said slider includes a casing provided with second raceway grooves opposed to first raceway grooves formed in said raceways of said track rail, rolling elements rolling between said first and second raceway grooves, end caps fixed to both end surfaces of said casing, and end seals fixed to end surfaces of said end caps, and
   wherein said bearing support metal member is accommodated in said bearing housing of said screw shaft support, with providing a clearance to allow position alignment between them, and said bearing support metal member is comprised of a cylindrical portion in which an outer ring of a bearing fits, and a flange integral with the cylindrical portion, said flange being abutted against an end face of said screw shaft support to fix said bearing support metal member on said screw shaft support.

2. The slide apparatus according to claim 1, wherein said end caps include grease nipples, which can be positioned in an opposed state in a space opened between said screw shaft supports and end portions of said recess, for use in supplying an oil.

3. The slide apparatus according to claim 1, wherein the positioning and fixing of said driving motor with respect to said screw shaft support are done by fitting a ring, which is press-fitted firmly in a motor attachment fixed to said driving motor, in a fixing hole formed in said screw shaft support.

4. The slide apparatus according to claim 1, wherein a stopper comprising a core metal member of a thin steel sheet, and rubber baked on said core metal member, and having a cushioning function is fixed to at least one of opposed end surfaces of said screw shaft support and said slider.

5. The slide apparatus according to claim 1, wherein said slider and said screw shaft are covered with a dust-proof cover laid between said screw shaft supports fixed to both end portions of said track rail, said slider having fixing flanges extending from side edge portions of said dust-proof cover in the sideway and upward directions.

6. A slide apparatus comprising
   a track rail having a pair of raceways extending in longitudinal direction thereof in a mutually opposed state,
   a slider capable of being moved slidingly along said raceways of said track rail,
   a nut fixed to said slider,
   a screw shaft engaged with said nut,
   a pair of screw shaft supports supporting two end portions of said screw shaft and fixed in a bridged state to upper surfaces of two end portions of said two raceways,
   a bearing supporting at least one of the end portions of said screw shaft,
   a bearing support metal member comprising thin steel sheet, to which said bearing is fixed, provided fixedly in a bearing housing provided on one of said screw shaft supports,
   a feed screw mechanism formed of said nut and said screw shaft and adapted to slidingly move said slider with respect to said track rail,
   a driving motor fixed to either one of said screw shaft supports so as to move said nut by rotating said screw shaft;

wherein sensor rails are provided on said track rail so as to extend in the longitudinal direction thereof, said sensor rails comprising cover portions formed so as to seal clearances between said track rail and said slider, and sensor-fixing rail portions formed on outer side of said cover portions so as to be integral therewith, and provided thereon with sensors for detecting the position of said slider, and wherein said bearing support metal member is accommodated in said bearing housing of said screw shaft support, with providing a clearance to allow position alignment between them, and said bearing support metal member is comprised of a cylindrical portion in which an outer ring of a bearing fits, and a flange integral with the cylindrical portion, said flange being abutted against an end face of said screw shaft support to fix said bearing support metal member on said screw shaft support.

\* \* \* \* \*